US006725288B2

(12) United States Patent
Nagao et al.

(10) Patent No.: US 6,725,288 B2
(45) Date of Patent: Apr. 20, 2004

(54) SYSTEM FOR TRANSMITTING DATA BETWEEN A DEVICE DATA AREA AND A VARIABLE DATA AREA OF A MEMORY ACCORDING TO A MEMORY MAP BASED ON AN IDENTIFYING DATA OF A DEVICE DETECTED

(75) Inventors: Yoshiyuki Nagao, Kyoto (JP); Masanori Kadowaki, Kyoto (JP); Masayuki Masuda, Kyoto (JP)

(73) Assignee: Omron Corporation, Kyoto (JP)

( * ) Notice: Subject to any disclaimer, the term of this patent is extended or adjusted under 35 U.S.C. 154(b) by 171 days.

(21) Appl. No.: 10/084,581

(22) Filed: Feb. 27, 2002

(65) Prior Publication Data

US 2002/0133240 A1 Sep. 19, 2002

(30) Foreign Application Priority Data

Mar. 14, 2001 (JP) ...................................... 2001-072570

(51) Int. Cl.[7] ......................... G06F 13/12; G05B 15/02; G05B 19/05

(52) U.S. Cl. ..................... 710/8; 710/3; 710/6; 710/52; 711/173; 711/202; 700/23; 700/24; 700/25

(58) Field of Search ............................ 710/3, 6, 15, 19, 710/8, 10, 36, 46, 52, 300–302; 711/147, 153, 170, 173, 202; 700/9, 18, 19, 23–25

(56) References Cited

U.S. PATENT DOCUMENTS

| | | | | |
|---|---|---|---|---|
| 4,648,064 A | * | 3/1987 | Morley | 710/45 |
| 4,897,834 A | * | 1/1990 | Peterson et al. | 370/432 |
| 5,721,722 A | * | 2/1998 | Kato et al. | 700/2 |
| 5,812,432 A | * | 9/1998 | Takizawa et al. | 703/8 |

* cited by examiner

*Primary Examiner*—Ilwoo Park
(74) *Attorney, Agent, or Firm*—Beyer Weaver & Thomas LLP

(57) ABSTRACT

A controller contains an I/O memory and uses a device detecting service to detect a device connected to it through a network and to obtain its device identifying data. A memory map setting service sets a device data area on the I/O memory according to the obtained device identifying data for exchanging data with the connected device and produces a memory map correlating the device data area with a variable data area on the I/O memory correlated to the device. The controller also includes a cyclic service and a data transmission service. The cyclic service transmits and receives data to and from the device periodically in the data linking format according to the memory map and by using the device data area on the I/O memory. The data transmission service transmits the data between the variable data area and the device data area.

4 Claims, 14 Drawing Sheets

| DEVICE | DEVICE SERIAL No. | NODE No. | MAKER |
|---|---|---|---|
| REMOTE IN 16 pt | #123456 | #6 | |
| REMOTE OUT 8 pt | #789ABC | #3 | |

ALL EDITED DEVICES

| SETTING DATA #1 | | VAR NAME |
|---|---|---|
| SETTING DATA #2 | | MEM. ADDRESS |
| ⋮ | | DATA TYPE |
| | | VAR TYPE |
| SETTING DATA #n | | DEVICE ADDRESS |

| MAP DATA #1 | | DATA TRANSMISSION TYPE |
|---|---|---|
| MAP DATA #2 | | DATA SOURCE DATA TYPE |
| ⋮ | | DATA SOURCE ADDRESS |
| | | I/O MEMORY ADDRESS |
| MAP DATA #n | | |

| | DATA TRANSMISSION TYPE | CONTENTS OF DATA SOURCE ADDRESS | CONTENTS OF I/O MEMORY ADDRESS |
|---|---|---|---|
| 1 | FROM DEVICE I/O DATA TO I/O MEMORY | DEVICE SERIAL No.,<br>CHANNEL No. | ACCESS MEMORY SPEC (USUALLY I/O MEM),<br>CHANNEL No. |
| 2 | FROM DEVICE I/O MEMORY TO I/O DATA | ACCESS MEMORY SPEC. (USUALLY I/O MEM),<br>CHANNEL No. | DEVICE SERIAL No.,<br>CHANNEL No. |
| 3 | FROM DEVICE I/O MEMORY TO I/O MEMORY | ACCESS MEMORY SPEC. (USUALLY I/O MEM),<br>CHANNEL No.<br>BIT POSITION | ACCESS MEMORY SPEC. (USUALLY I/O MEM),<br>CHANNEL No.<br>BIT POSITION |

*FIG. 8*

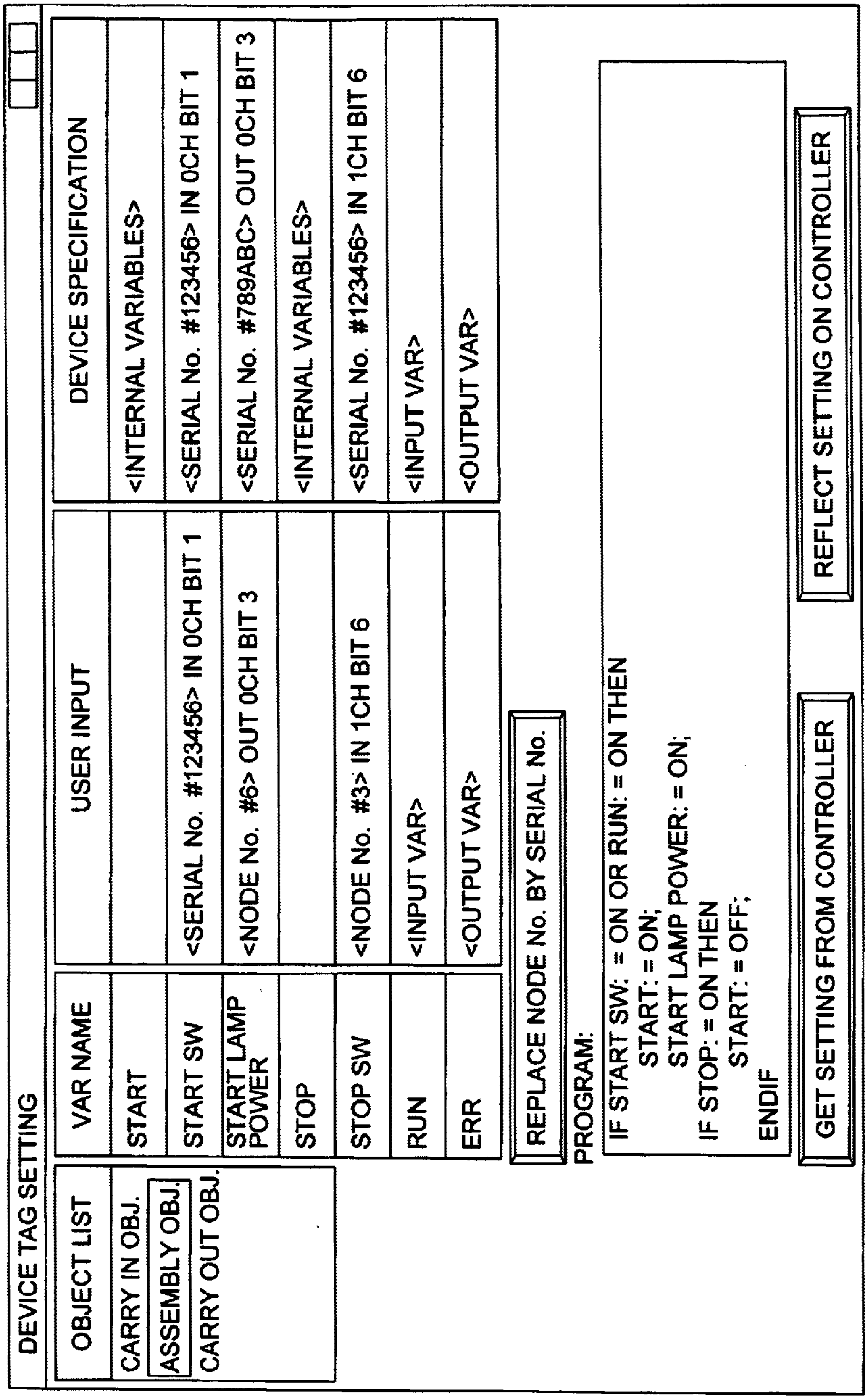

FIG. 16

| DEVICE TAG SETTING | | | |
|---|---|---|---|
| OBJECT LIST | VAR NAME | USER INPUT | DEVICE SPECIFICATION |
| CARRY IN OBJ.<br>ASSEMBLY OBJ.<br>CARRY OUT OBJ. | START | | <INTERNAL VARIABLES> |
| | START SW | <SERIAL No. #123456> IN 0CH BIT 1 | <SERIAL No. #123456> IN 0CH BIT 1 |
| | START LAMP POWER | <NODE No. #6> OUT 0CH BIT 3 | <SERIAL No. #789ABC> OUT 0CH BIT 3 |
| | STOP | | <INTERNAL VARIABLES> |
| | STOP SW | <NODE No. #3> IN 1CH BIT 6 | <SERIAL No. #123456> IN 1CH BIT 6 |
| | RUN | <INPUT VAR> | <INPUT VAR> |
| | ERR | <OUTPUT VAR> | <OUTPUT VAR> |

REPLACE NODE No. BY SERIAL No.

PROGRAM:
IF START SW: = ON OR RUN: = ON THEN
   START: = ON;
   START LAMP POWER: = ON;
IF STOP: = ON THEN
   START: = OFF;
ENDIF

GET SETTING FROM CONTROLLER     REFLECT SETTING ON CONTROLLER

SYSTEM FOR TRANSMITTING DATA BETWEEN A DEVICE DATA AREA AND A VARIABLE DATA AREA OF A MEMORY ACCORDING TO A MEMORY MAP BASED ON AN IDENTIFYING DATA OF A DEVICE DETECTED

BACKGROUND OF THE INVENTION

This invention relates to controllers, extension boards and communication units.

It has been known to construct control systems in the industrial areas, such as for factory automation (FA), by appropriately combining a control unit (herein referred to as "controller") such as PLC and apparatus (herein referred to as "devices") to be controlled by the controller. One or more devices may be connected to a PTC either directly or through a network and the PTC communicates with these devices, carrying out specified processes repeatedly and cyclically according to a user program. This is usually done by assigning on the network a unique node number as an identifier for each device and by specifying these node numbers (network addresses) to access the devices. In the case of a device connected through a bus, a unit number will be assigned instead of a node number, but the basic idea is the same. The actual communication of data is carried out by preliminarily assigning a memory address to be used by the devices on an I/O memory inside the PLC and the user program communicates with devices by writing into or reading from this memory.

Thus, it is required to set addresses of various kinds for the devices. Since the assignment of addresses is a cumbersome task, it is desirable to carry out this task automatically. An attractive environment would be where an address can be assigned to a device by a method of the so-called plug-and-play format (used in the world of office automation represented by personal computers) as soon as it is mounted.

While no more than several devices are connected to a personal computer, a much larger number of input and output devices are set on the network of a PLC and such devices are usually connected to I/O devices of sensors and relays (solenoids). Thus, hundreds and thousands of devices may end up being managed by a single PLC, and the plug-and-play format which may be good for a personal computer cannot always be utilized simple-mindedly.

It must also be remembered that if the resources of a PLC are assigned automatically, the resources to be accessed (such as memory addresses) may end up changing each time. Moreover, many user programs (such as ladder programs) for a PLC are prepared by directly writing within the program the addresses to be accessed. Thus, memory addresses which have been automatically assigned must be manually set inside the program. If the number of the connected devices is as large as explained above, the trouble may be enormous. If the memory addresses change frequently, furthermore, the program itself may have to be updated.

SUMMARY OF THE INVENTION

It is therefore an object of this invention to provide controllers, extension boards and communication units capable of using the plug-and-play format such that an extension can be easily made to include devices adapted for the plug-and-play format.

A controller embodying this invention, with which the above and other objects can be accomplished, may be characterized as comprising device detecting means, memory map setting means, communicating means and data transmitting means. The device detecting means is for detecting a device directly or indirectly connected to the controller and obtaining device identifying data thereon. The memory map setting means is for setting a device data area on a memory means contained in the controller, based on the obtained device identifying data, for transmitting and receiving data to and from the device and producing a memory map which correlates the device data area with a variable data area on the memory correlated to the device. The communicating means is for periodically transmitting and receiving data to and from the device according to the memory map by using the device data area on the memory means. The data transmitting means is for transmitting data according to the memory map between the variable data area on the memory means and the device data area.

In the above, direct connection means a connection to the controller through a bus or the like, and indirect connection means a connection through a network or a controller. Device identifying data are assigned to the individual devices for distinguishing them one from the others, including the serial number and the device name.

The controller is an apparatus capable of communicating with and controlling the operations of devices connected thereto. It may be any of apparatus that are used in factory automation in a broad sense of the expression, including an industrial robot. In a narrower sense of the expression, it may be a device for calculating and outputting output data to a solenoid coil or the like according to a control program prepared by the user in a manufacturing or production field based on input data, say, from a sensor, thereby controlling the motion of a target apparatus such as a robot, a cylinder, a motor and other moving elements on a production line.

What is herein referred to as a device may be any of various constituent elements on a production line adapted to receive input and output data to and from a controller through a network or a bus. Examples of a device include input devices such as sensors, switches, multi-point input terminals and cameras, output devices such as solenoid coils, multi-point output terminals, cylinders and motors, and combined input-output devices such as robots. The controller itself may operate as a combined input-output apparatus. In such a case, the controller can also be an example of what is herein referred to as a device.

According to this invention, since data on the memory can be transmitted to another data area by means of the data transmitting means, it is not necessary to write the addresses of devices directly in a program as external I/O variables. Even if a control program specifies a fixed variable data area, data can be transmitted to and from the device data area, and hence data can be exchanged with the devices through the communication means. Thus, even if the address of a device to be referenced is changed, it can still be referenced by updating the memory map without modifying the variable data area. In other words, it is possible to respond to a change in the address of a device without changing the control program.

Since device detecting and memory map setting means are provided, a memory map can be created automatically. Thus, descriptions (with variables) of control programs executed by the controller and detachably attachable devices can be automatically correlated such that a plug-and-play format can be operated and the control programs are always capable of accessing correct devices.

The controller may be provided further with correlation data storing means for storing correlation data for correlating the control program and the device such that the control program can access the device by referencing the correlation data to thereby identify an access destination ("access address").

With such correlation data storing means thus provided, the control program can be written in a way independent of the system structure or the network structure. For example, I/O data for devices may be made accessible with variables. The concept of "object" is an advanced logical concept whereby data and programs for operating devices are inherently controlled such that the user can create and edit control programs without being conscious of the presence of internal data and internal programs. For example, different devices can be accessed similarly from a control program if the manners and contents of their specifications are the same.

An extension board embodying this invention is adapted to be detachably attached to a controller such as described above for controlled devices connected thereto, characterized similarly as comprising device detecting means, memory map setting means, and data transmitting means, as explained above. Since such an extension board is provided with the plug-and-play function, conventional controllers without this function can be operated in this format by having such an extension board attached thereto.

A communication unit embodying this invention is for communicating with devices adapted to be controlled by a controller to which it is connected and may be characterized similarly as comprising device detecting means, memory map setting means, and data transmitting means, as explained above. Like the extension boards described above, the communication unit according to this invention is provided with the plug-and-play function. Thus, a controller with the plug-and-play function can be formed by combining the main body unit of a conventional controller and a communication unit of this invention.

BRIEF DESCRIPTION OF THE DRAWINGS

FIG. 8 shows an example of the contents of mapping data.

FIG. 16 shows an example of the object editor of FIG. 15.

Throughout herein, components which are equivalent or at least similar to each other are indicated by a same symbol and may not be repetitiously explained for the convenience of the disclosure.

DETAILED DESCRIPTION OF THE INVENTION

Figure 1:
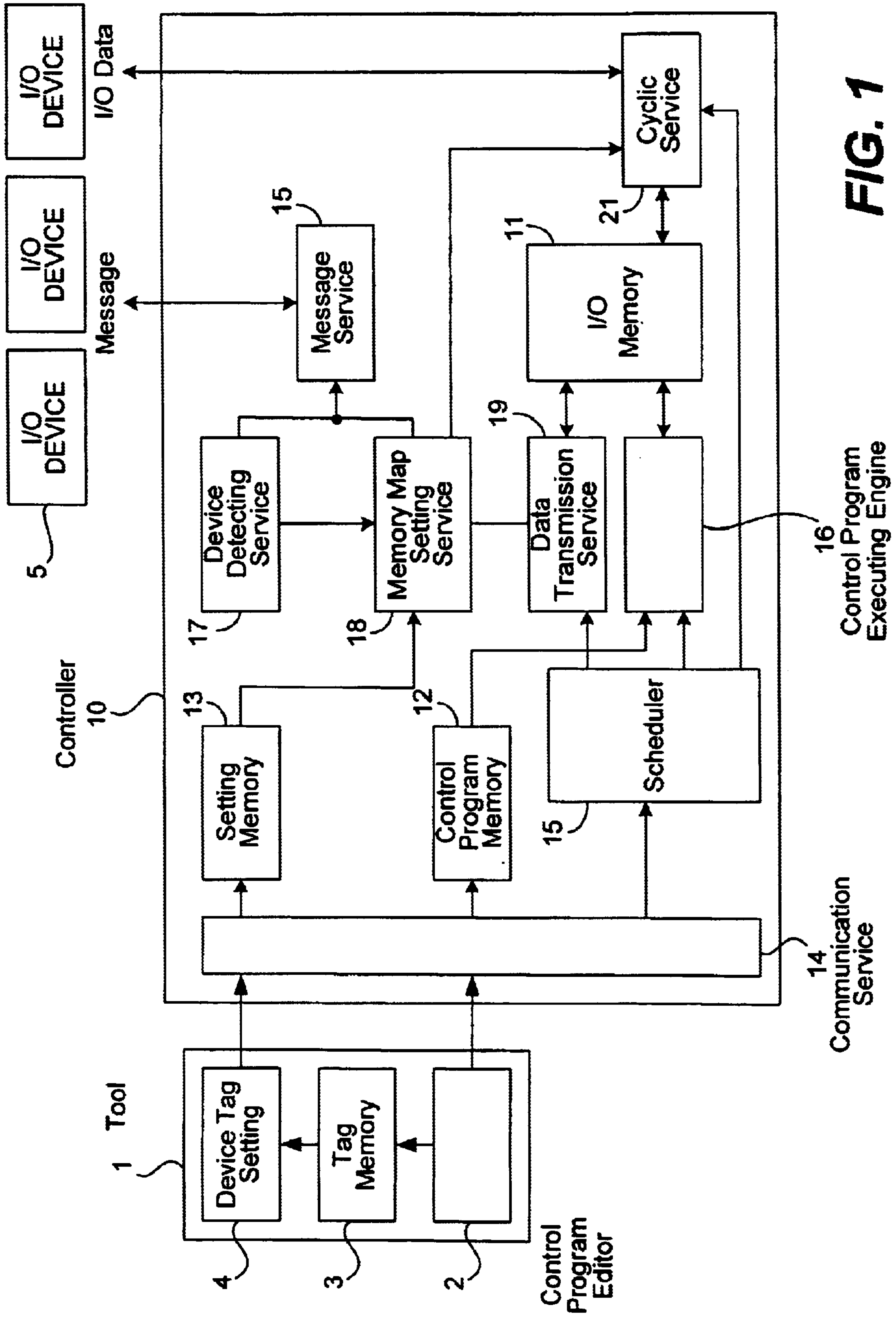
FIG. 1 is a block diagram of a communication unit embodying this invention.

The invention is described next by way of examples. FIG. 1 shows a communication unit embodying this invention having a controller 10 such as a PLC which is provided with a tool 1 and serves to carry out a downloaded user program (control program) cyclically to thereby manage input/out devices 5 connected thereto through a network or a bus system. This system structure is no different from prior art structures. The tool 1 may be disconnected from the controller 10 after the downloading.

The I/O devices 5 are for receiving command messages from the controller 10, carrying out the commanded processes and returning a response message to the controller 10. They also serve to retrieve data from sensors and switches connected thereto either periodically or in response to an event and transmit them to the controller 10 as I/O data. Additionally, they have the function of recording and storing device identifying data (hereinafter also referred to as the device data) for identifying the individual devices (such as serial numbers and device names) and transmitting these device identifying data as a response message to the controller 10 in response to a specified command message therefrom.

Figure 2:
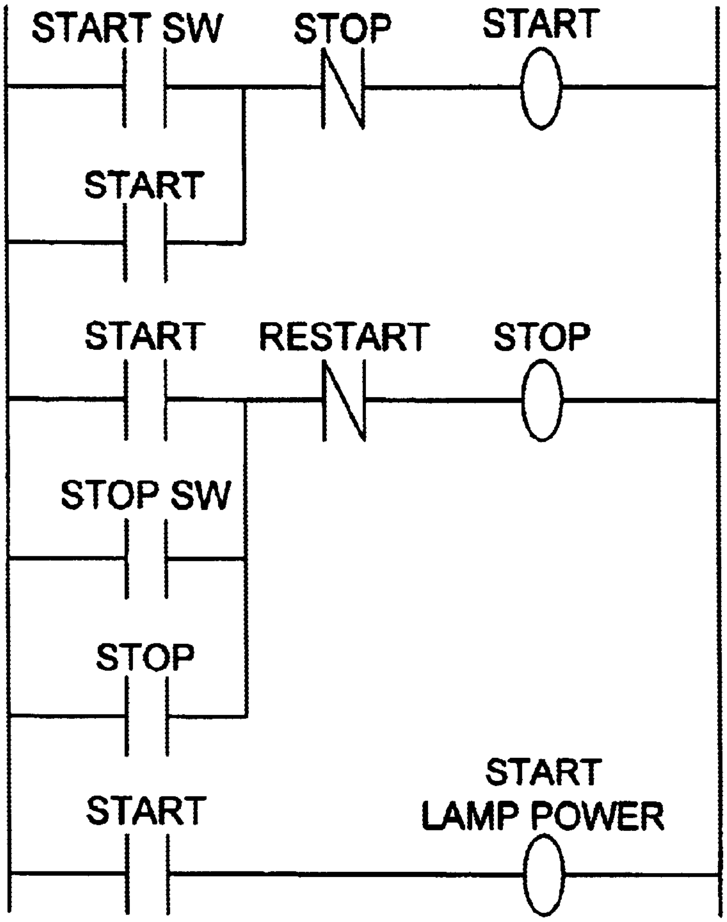
FIG. 2 shows an example of control program.

The tool 1 is for creating (inclusive of editing) control programs for the controller 10, correlating tags (to be explained below) with the I/O devices 5 and transmitting such created control programs to the controller. It comprises, as shown in FIG. 1, a control program editor 2, a tag memory 3 and a device tag setting means 4. The control program editor 2 is a user interface for creating (and editing) control programs in the ladder language, serving also to transmit created control programs. As is well known, control programs in the ladder language generally have a structure as shown in FIG. 2, using variables for the input and output such as "Start SW", "Stop" and "Start".

Figure 3:
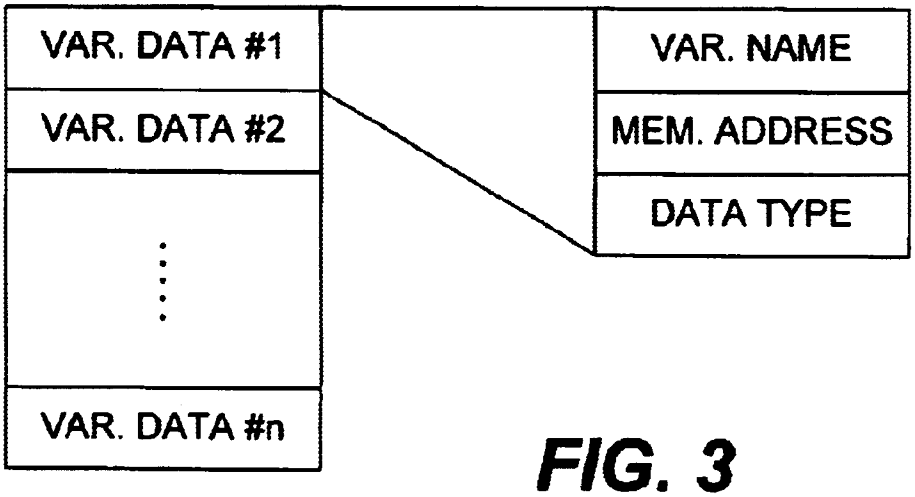
FIG. 3 shows an example of data structure in the tag memory.

There are two kinds of variables; one being the external I/O variables correlated to the devices and the other being the internal I/O variables which are the rest. Variables "Start SW", "Stop" and "Start" in FIG. 2 are external I/O variables. External I/O variables must be correlated to a corresponding one of devices, and the necessary correlation-establishing process is carried out by the device tag setting means 4. Areas may be assigned to these external I/O variables on an I/O memory (or "memory means") 11 inside the controller 10. In the present example, this area assignment is carried out automatically by the control program editor 2 and the data on the variables in the control program are stored in the tag memory 3. In other words, data on all variables used by the control programs are stored in the tag memory 3. The data to be stored are received from the control program editor 2, and the data on the variables (variable name, memory address and data type) are recorded and stored in a data structure as shown in FIG. 3. The variable name (such as "Start" and "Start SW") is the name of the variable within the control program. The "memory address" is automatically determined by the control program editor 2 and shows the address at which the control program accesses. This memory address is comprised of access memory specification, a channel number and a bit position. The access memory specification is usually "I/O memory" and the data type shows the type of the variable such as BOOL and INT.

Figure 4:
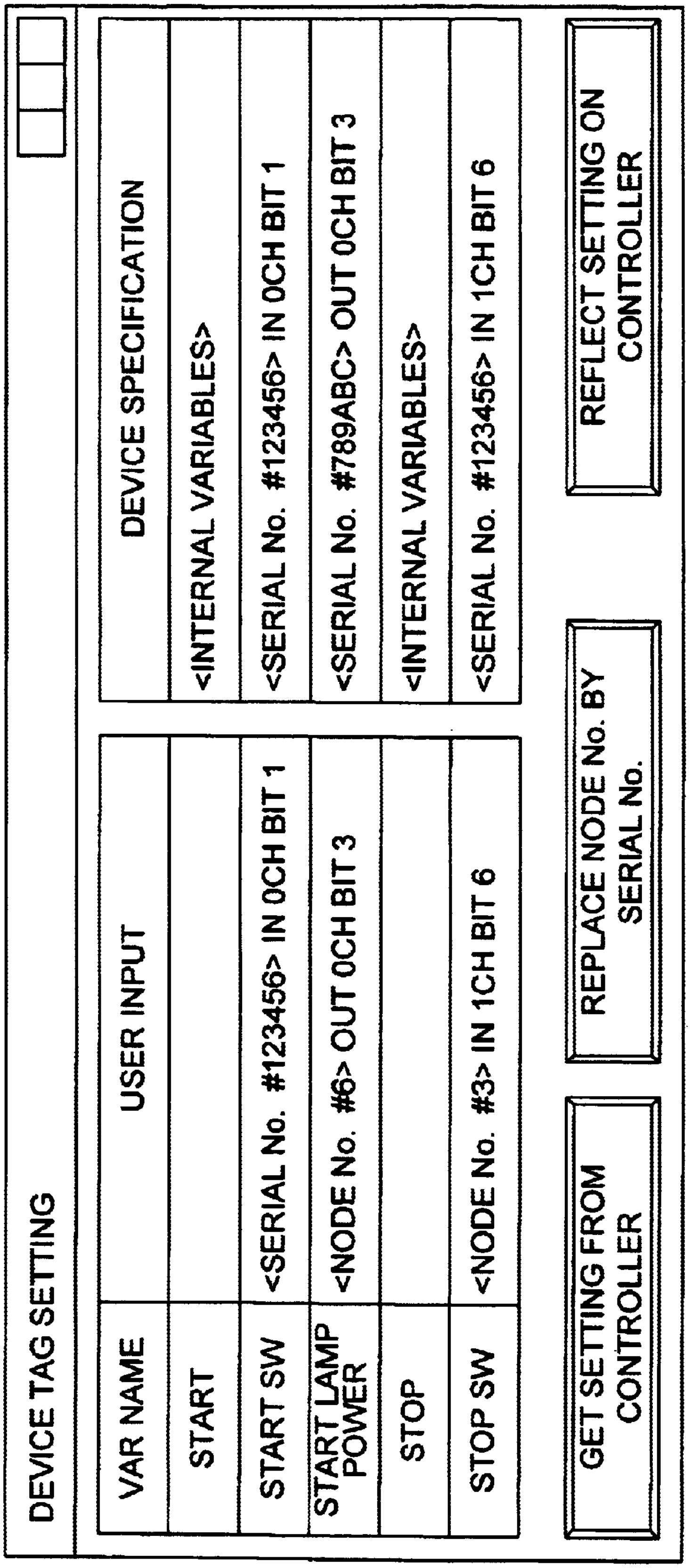
FIG. 4 is an example of input screen displayed on the display screen of the tool.

A tool is normally composed of a control program editor and a tag memory, but the tool 1 as shown in FIG. 1 includes also a device tag setting means 4. This is a user interface for allowing the user of the control program to specify which variable is an external I/O variable by consulting the variable data stored in the tag memory 3. Since an input screen as shown in FIG. 4 is displayed on the display screen of the tool 1, data on the I/O variables are set at indicated positions thereon on the basis of the data inputted by the user and transmitted to the controller 10. In other words, the device tag setting means 4 serves to firstly obtain data on a variable name from the tag memory 3, to create a list with the variable names inserted at appropriate positions on the input screen as shown in FIG. 4 and to display the list on the display screen of the tool 1.

On this list displayed on the display screen, items to be inserted by the user are specified by operating an input device (not shown) of the tool 1. Devices are specified according to this example by specifying a serial number or a node number. This is done by rewriting such a number as a text in a specified format such that the corresponding variable is specified as an external I/O variable. If no input is made, the variable is considered an internal variable.

According to the example shown in FIG. 4, devices are specified by their serial numbers. Since serial numbers are production numbers assigned to each device separately as it is produced and hence there are no two devices having the same serial number, they can serve as an unique ID on the network. Thus, the controller 10 can distinguish among devices by their serial numbers which are uniquely their own and automatically assign its resources.

Care is being taken according to this invention against a situation where the serial number is not known. Since the specification can be effected also by way of a node number, the user can make the specification by way of its node number even if its serial number is unknown. In this situation, however, the node number must be changed to the serial number before the set data are reflected on the controller. For the purpose, the tool 1 is connected to the network either directly or indirectly and the icon "Replace Node Number by Serial Number" on the screen is clicked upon. In response, the device tag setting means 4 asks for the serial number of the device which has been specified through its node number. As a response is returned from the device connected at the specified node number, the device identifying data for this device are modified by the serial number thus communicated.

After all specifications are completed, the icon "Reflect Setting on Controller" on the screen is clicked upon. The device tag setting means 4 responds by transmitting the set contents to the controller 10. Only data on external I/O variables are thereby transmitted to the controller 10.

Figure 5:
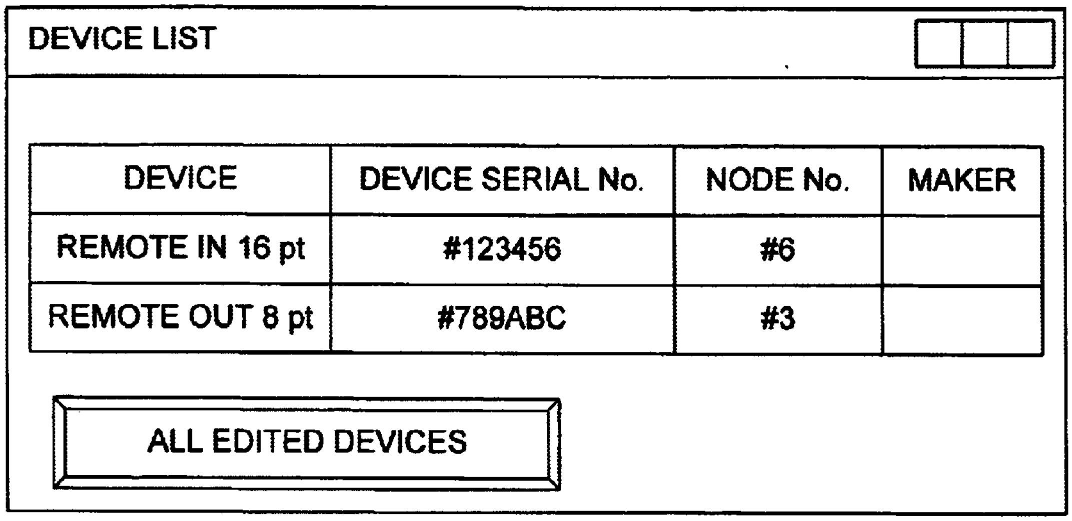
FIG. 5 is an example of a list of all devices that may be displayed.

In this example, a list of all devices may be displayed as shown in FIG. 5. If the user clicks on the icon "All Edited Devices", a question is broadcast to all devices that are connected to the network for their device names and serial numbers. As each device that receives this question will respond with requested data, the tool 1 (or its device tag setting means 4) causes a device list as shown in FIG. 5 to be displayed on the display screen. The user can consult such a list when inputting a serial number on the input screen as shown in FIG. 4.

The controller 10 may also be provided with the function of asking the device connected to a specified node for its serial number and receiving an answer thereto. With such a function, the tool 1 will send set data directly to the controller 10 when the input is made through the node number such that the controller 10 will function to replace the node number with the serial number.

Prior art tools include only a control program editor and a tag memory and their functions are not different from those of the control program editor and the tag memory which are included in the tool 1 embodying this invention. A tool according to the present invention, therefore, can be obtained by merely adding the device tag setting means as explained above to allow the use of the plug-and-play format. In other words, no major modifications are necessary on prior art tools to obtain tools according to this invention. Thus, the time and cost required for development can be reduced and the users are not required to buy a new tool for using the plug-and-play format.

Next, the controller 10 is explained more in detail. As shown in FIG. 1, the controller 10 includes a communication service 14 for communicating with the tool 1. This communication service 14 is for requesting processing of a specified function block or transmitting data in response to a command from the tool 1. Commands from the tool 1 includes "Record Setting Data", "Record Control Program", "Execute Control Program" and "Stop Control Program". One of the data transmission functions is for receiving from the tool 1 a control program created (edited) by the control program editor 2 based on the "Record Control Program" command used by the control program editor 2 and storing it in a control program memory 12. The contents of the data thus handled are actually a compilation of a control program created by the control program editor 2. Another of the data transmission functions is for receiving from the tool 1 device tag setting data based on the "Record Setting Data" command and storing them in a setting memory 13. One of the processing requesting functions is for requesting the execution of a control program to a scheduler 15 on the basis of a command from the tool 1 on the basis of the user's operation or the "Execute Control Program" command carried out by a signal from a switch set outside the controller 10. A control program executing engine 16 serves to follow a command from the scheduler 15 to begin the execution of the control program stored in the control program memory 12. When the "Stop Control Program" command is received, the communication service 14 commands the execution of the control program to be stopped.

Since the storing of the control program in the control program memory 12, the execution of the stored control program and the stopping of the execution are all known processes, detailed explanations are omitted.

Figure 6:
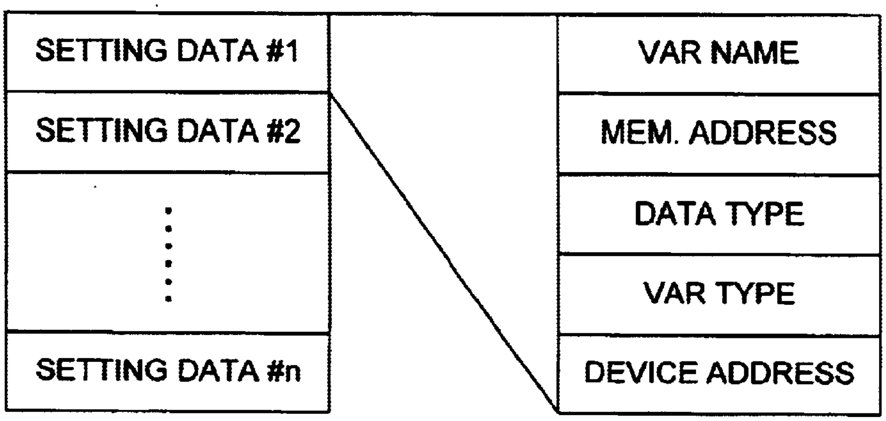
FIG. 6 shows an example of data structure in the setting memory.

The setting memory 13 stores the setting data with a data structure as shown in FIG. 6, comprising variable name, memory address, data type, variable type and device address. For variable name, memory address and data type, data stored in the tag memory 3 and transmitted from the device tag setting means 4 are stored. For variable type, a numerical value showing the difference between the input and out external variables is stored. The device address is comprised of device serial number, channel number and bit position.

In this example, the controller 10 includes a device detecting service 17 (or "device detecting means") for periodically monitoring the devices connected to the controller 10 either directly or indirectly. Command messages for obtaining device data are transmitted to the devices connected to the network, for example, through a message service 20. Functions of the message service 20 include transmission of command messages to specified or all nodes on the network according to a command from the function block, receiving response messages from the I/O devices 5 and returning the received response messages to the function block.

The devices respond to the command message by transmitting back as response messages their device data such as their device names, serial numbers, node numbers, I/O sizes, maker names, etc. These received device data are collected and compared with already stored device data. If there is a difference, it is determined that a new device has been connected, say, to the network, and difference data (on the newly connected device) are transmitted to a memory map setting service 18. Immediately after the controller 10 is switched on, however, the acquired data are transmitted to the memory map setting service 18 because there are no already existing data. The memory map setting service 18 is for obtaining device data from the device detecting service 17, making a memory map based on the received data and transmitting the produced memory map to a data transmission service 19 and a cyclic service 20.

Figure 7:
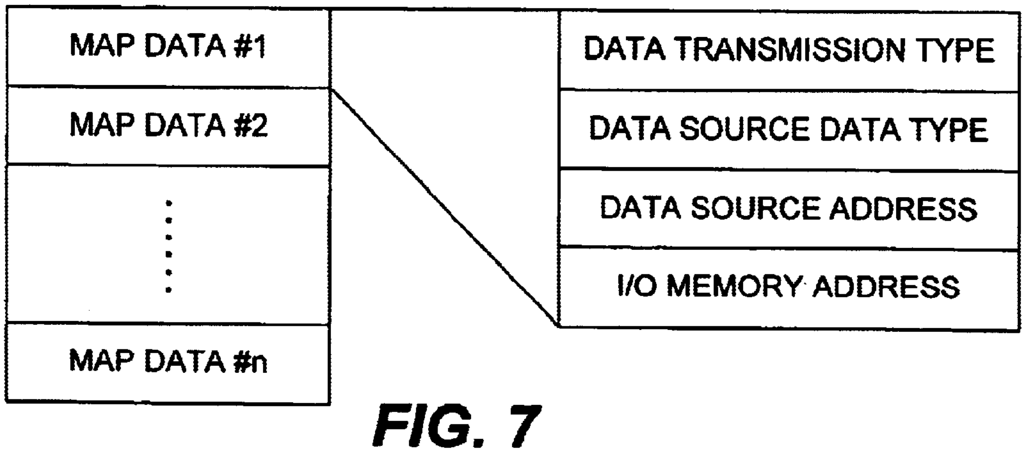
FIG. 7 shows an example of mapping data created by the memory setting service.

The memory map is for showing data sources and where these data sources should be mapped (copied) on the I/O memory. Its data structure is as shown in FIG. 7. The data transmission type may be any of the following: (1) "From device I/O to I/O memory", (2) "From I/O memory to device I/O data, and (3) "From I/O memory to I/O memory". A numerical symbol indicating one of these three is stored. Depending on the data transmission type, data as shown in FIG. 8 are stored at the data source address and the I/O memory address at the destination of the transmission. The area referred to as "Data source data type" stores a numeral indicative of a type such as BOOL and INT. In the case of a data array, the number of elements is also stored.

Of the three data transmission types mentioned above, (1) and (2) are types of data transmission which have been commonly used in a format herein referred to as the "data linking format" whereby portions of memory areas of devices at different nodes are preliminarily assigned for automatically copying data among the nodes. The function for and process of using this format will be respectively referred to as the "data linking function" and the "data linking process", and the memory areas used for automatically copying data in this format will be referred to as a "data linking area". According to this invention, the third data format (3) is provided such that the memory map can be used for the input and output operations of external I/O variables, as will be explained more in detail below.

Figure 9:
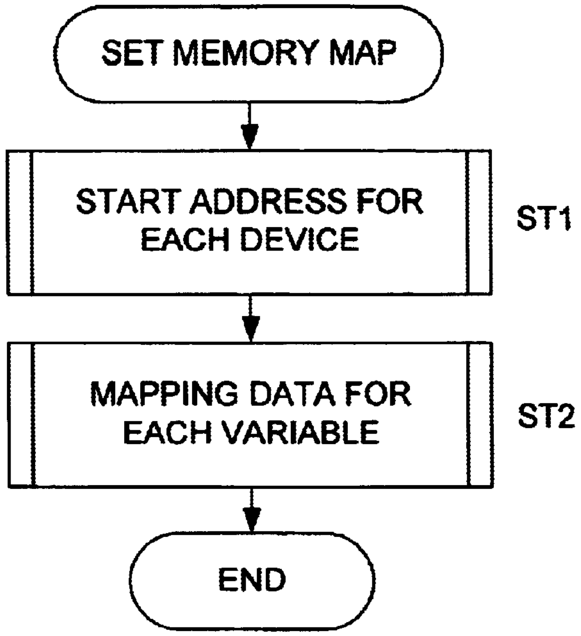
FIGS. 9, 10 and 11 are flowcharts for the function of the memory map setting service.
Figure 10:
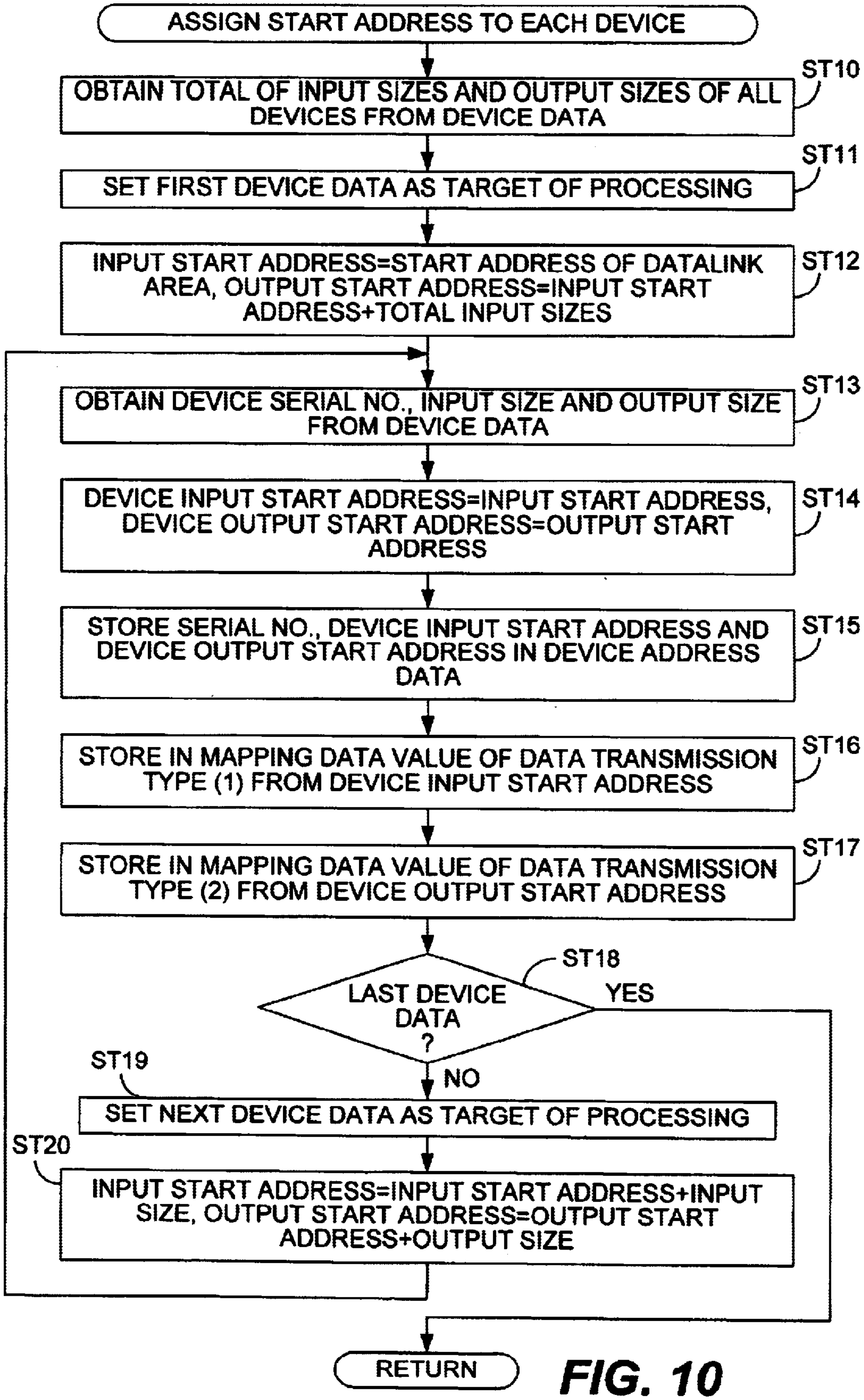
Figure 11:
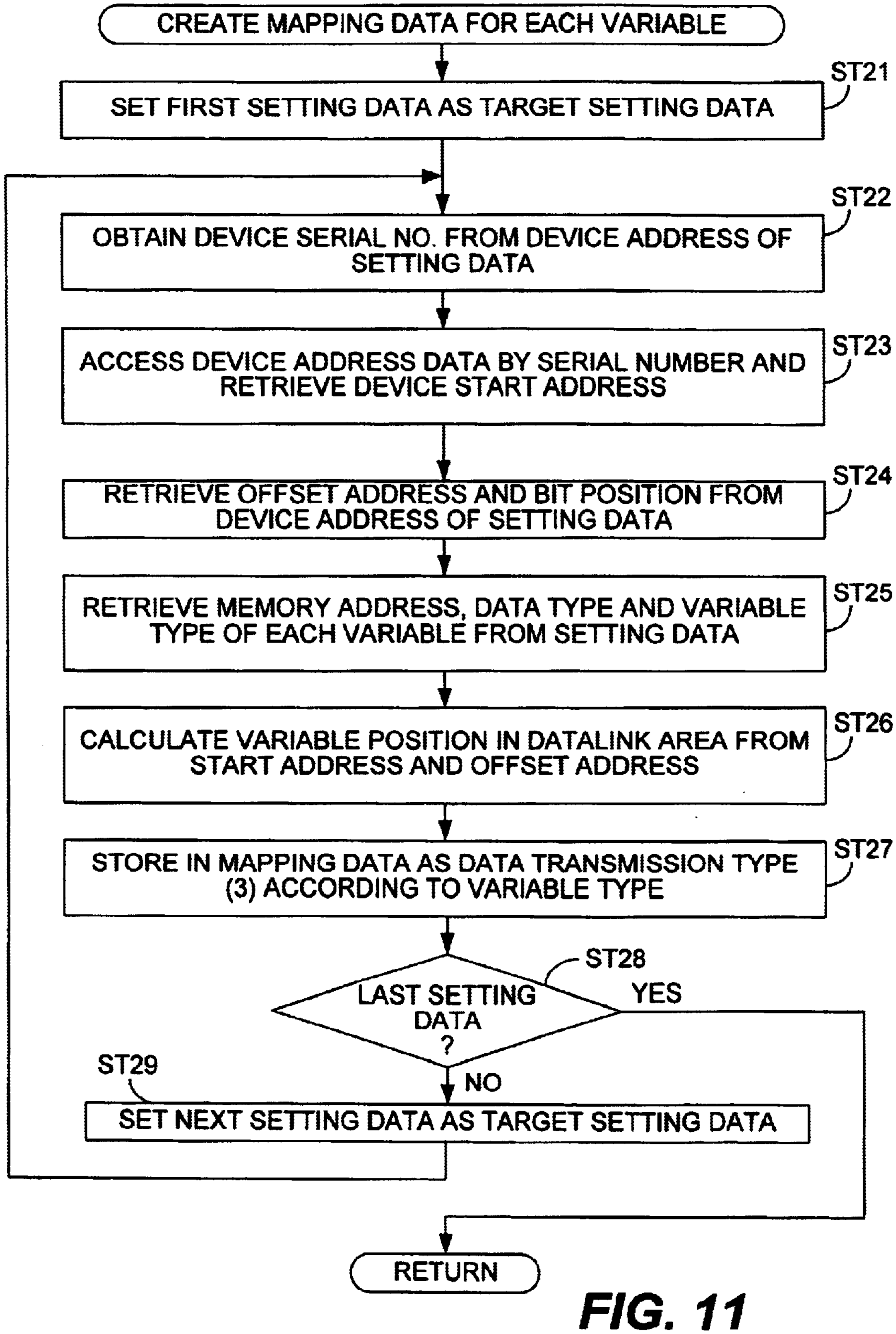

The processing by the memory map setting service 18 is shown by the flowcharts in FIGS. 9–11. Firstly, a start address is assigned to each device (Step ST1). This is a process well known in the prior art for storing data types (1) and (2). FIG. 10 shows an algorithm for this process.

In the algorithm of FIG. 10, the totals of input sizes and output sizes of all connected devices are obtained firstly on the basis of the device data obtained from the device detecting service 17 (Step ST10). The first device data are set as the target of processing and the input start address and the output start address are set (Steps ST11 and ST12). In the present example, the storage area for the output data is set after the storage area for the input data such that data on the devices are assigned without any empty areas in between.

Figure 12:
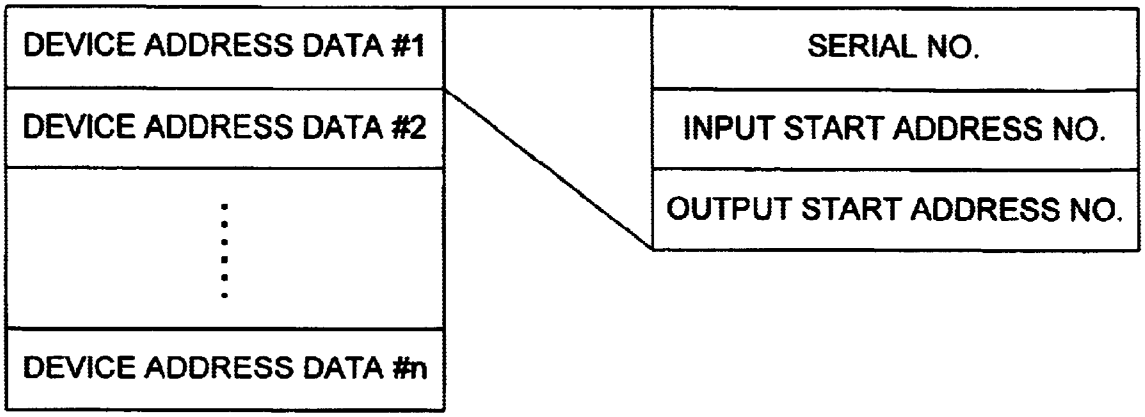
FIG. 12 shows an example of data structure of device address data.

Next, the serial number and the I/O sizes of the device are retrieved from the target device data and an I/O memory (data linking area) is assigned to this device (Steps ST13–ST17). This is done firstly by setting the presently set input and output start addresses as the input and output addresses of this device (Steps ST13–ST14) and storing the addresses thus set in the device address data memory (as shown in FIG. 12) managed by the memory map setting service 18 in correlation with the serial number (Step ST15). Specified data based on each of the start addresses are thereafter stored in the memory map (Step ST16–ST17).

If the target device for the processing is not the last one, data on the next device are selected as the target device data (Steps ST18–ST19) and the input and output start addresses for the newly selected target are obtained (Step ST20). This may be done by adding the portion of the memory area used for the previously processed device (known from the I/O sizes obtained in Step ST13), and the process returns to Step ST13 to repeat the steps thereafter. After the last device has been processed (YES in Step ST18), Step ST1 in the flowchart of FIG. 9 is completed.

Next, mapping data are prepared for each variable (ST2) according to the algorithm shown in FIG. 11. This is done sequentially from the first of the setting data stored in the setting memory 13. Thus, the first of the setting data are initially set as the target setting data (Step ST21), and the serial number of the device is obtained from the device address of the target setting data (Step ST22). The serial number thus obtained is used as a key to access the device address memory created in Step ST1 and to obtain the I/O start addresses of this device (Step ST23).

Next, the offset address and the bit position are retrieved from the device address of the setting data, as well as the memory address, the data type and the variable type of each variable (Steps ST24 and ST25). Variable positions in the data linking area are obtained on the basis of the retrieved data and calculated values are stored in the memory map (as data transmission type (3)) according to the variable type (Steps ST26 and ST27).

If it is not the last of the devices (NO in Step ST28), the next setting data are selected as the target of processing (Step ST29) and the algorithm returns to Step ST22. The steps described above are thus sequentially repeated. Variable positions are calculated on the basis of all setting data and stored in the memory map to complete Step 2 of FIG. 9.

Thus, input data obtained by the I/O devices 5 come to be periodically reflected in the I/O memory 11 inside the controller 10 according to the mapping data set by the processing described above, and a data linking process is carried out to periodically output values on the I/O memory 11 inside the controller 10 to the I/O devices 5.

The data transmission service (or "data transmitting means") 19 and the cyclic service (or "communication means") 21 are provided to the controller 10 for carrying out the data linking process. The cyclic service 21 is operated on the basis of mapping data of data transmission types (1) and (2), and the data transmission service 19 is operated on the basis of mapping data of data transmission type (3).

The cyclic service 21 has been conventionally well known, serving to obtain mapping data of data transmission types (1) and (2) and to transmit data on one area of the I/O memory 11 onto another area of the I/O memory 11 on the basis of the obtained mapping data. The timing for the transmission is provided from the scheduler 15. After all the relevant mapping data have been processed, the end of the processing is communicated to the scheduler 15.

Mapping data of data transmission type (3), produced by carrying out Step ST2 (or Steps ST21–ST29) described above, are retrieved by the data transmission service 19 for transmitting data on the I/O memory 11. The data transmission service 19 functions to transmit data on the I/O memory 11 onto another area of the I/O memory 11 on the basis of the retrieved mapping data at a timing communicated from the scheduler 15 and to inform the scheduler 15 when this process is completed. It is one of the features of this invention that the data transmission service 19 allows the I/O memory 11 to be used for the input and output of external I/O variables.

Figure 13:
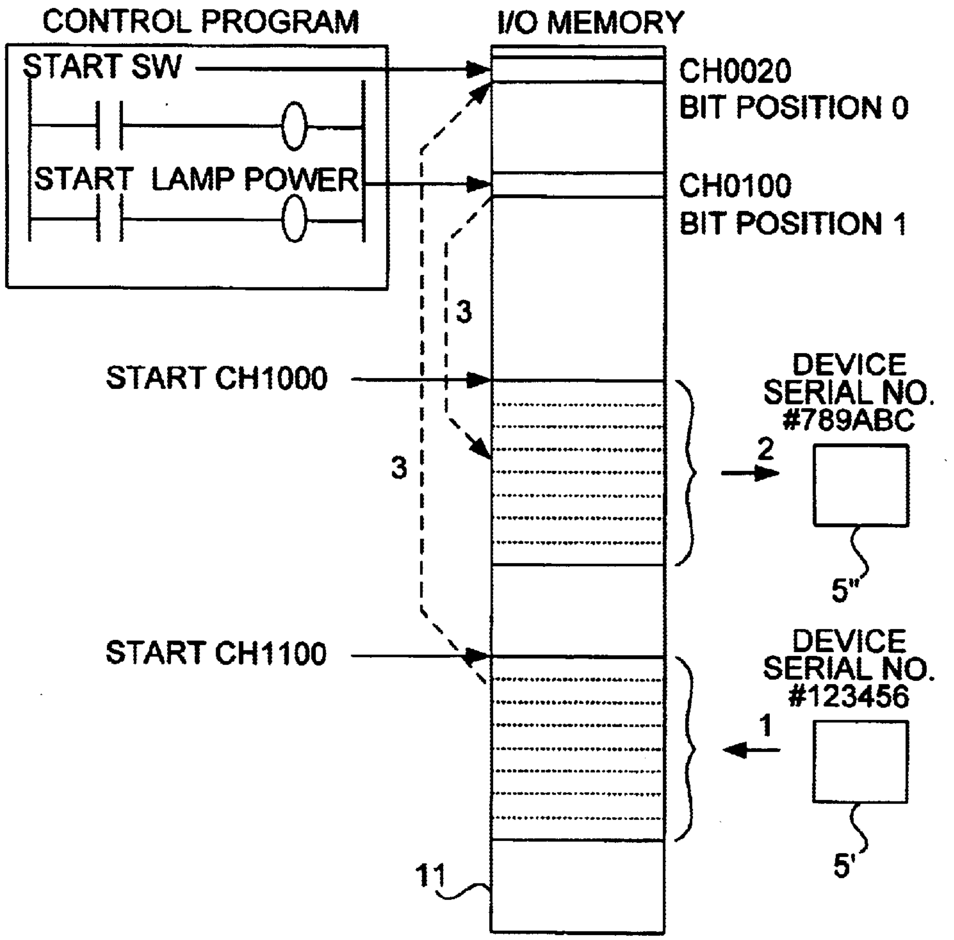
FIG. 13 is a diagram for describing the input-output processing of external I/O variables.

The process outlined above will be described next more in detail with reference to FIG. 13, showing data storage areas at specified addresses on the I/O memory 11 according to the data transmission types (1), (2) and (3). Of the external I/O variables, "Start SW" and "Start Lamp Power" are respectively assigned within the control program to addresses on the I/O memory 11 "channel number 20 (CH0020), bit position 0" and "channel number 100 (CH0100), bit position 1". A portion of the I/O memory 11 with a specified size from the starting channel number 1100 (start CH1100)) is assigned as the area for storing data from a device (serial number #123456) 5'. Another portion with another specified size from the starting channel number 1000 (start CH1000) is assigned as the area for storing data from another device (serial number #789ABC) 5".

Data transmission by the cyclic service 21 is shown by solid arrows and data transmission by the data transmission service 19 is shown by broken arrows. Next, the I/O processing for external I/O variables by these services 19 and 21 will be explained by way of an example.

Consider "Start SW" as looked at from the side of the device. In the hardware form, "Start SW" written in the control program is a switch connected to the device 5'. The ON/OFF condition of this switch is communicated to the device 5' as I/O data and received by the controller 10 through the network and the cyclic service 21. The I/O data thus received are transmitted as a block by the cyclic service 21 to a specified area on the I/O memory starting from a specified start position (channel number 1100 in this example) on the basis of the memory mapping data specified by the memory map setting service 18.

The data transmission service 19 also serves to transmit the data on a specified bit on the I/O memory (with channel number 1100 in this example) transmitted as a block by the cyclic service 21 to the variable data area (with channel number 20 and bit position 0 in this example) referenced by the control program. This transmission is carried out on the basis of the memory map specified similarly by the memory map setting service 18. Thus, the control program comes to be able to reference input data received through the devices as external input variable "Start SW".

The value of external output variable "Start Lamp Power" outputted by the control program is written in the variable data area (channel number 100, bit position 1 in this example) specified by the memory map setting service 18 and is then transmitted by the data transmission service 19 to a specified area (specified bits in a block starting at channel number 1000 in this example) of the I/O memory assigned to the device 5'. On the basis thereof, the data in the specified area starting at channel number 1000 are transmitted as a block to the device 5" and the ON/OFF control on the power source for a lamp is carried out.

Thus, data are produced by means of a service called "memory mapping" within the controller 10 according to the condition of the network (such as how node numbers of devices are set). Even if a node number is changed during the operation of a production line, for example, the correlation between the external I/O variables and the devices are maintained by such data and hence data can be correctly inputted and outputted.

Since the cyclic service 21 is a data input and output means commonly used for a data linking process in the production and manufacturing areas, a prior art cyclic service can be incorporated into the present invention with any modifications.

The controller according to this invention identifies a device by its serial number. Thus, even if the node number of a device has been changed, input data of the device are correctly stored in the data area for the external I/O variables referenced by the control program and the values of the variables are outputted to the device. Thus, once the device tag setting is carried out, any change in the device structure can be detected. Unlike the prior art technology, the control program and the memory assignment need not be changed even if node numbers are changed.

Moreover, control programs structured with codes for transmitting data from the mapping data can be mechanically produced. Instead of having the memory map setting service 18 to create a control program from the mapping data, having it stored in the control program memory 12 and having the data transmission carried out by the data transmission service 19, the control program executing engine 16 may be used for the processing. In such an application, the data transmission service can be dispensed with.

It was stated that no additional functions are added to the control program editor 2, etc. in the case of the example described above, but there are some functions that are not needed. In the case of a control program for a prior art controller, external I/O variables and other internal I/O variables were controlled separately, with special memory areas being provided. The example described above is advantageous in that the user can handle them without separating them. Thus, the control program editor 2 for this example of the present invention is not required to process external and internal I/O variables separately. As a result, the structure and the algorithms for the control program editor can be made simpler.

Moreover, the control program executing engine 16 of the controller 10 is not required to support any particular commands for the purpose of this invention. Since no extra memory area is required to be specially prepared, the number of memory access types can be reduced. As a result, the command system for the executing engine can be simplified.

Figure 14:
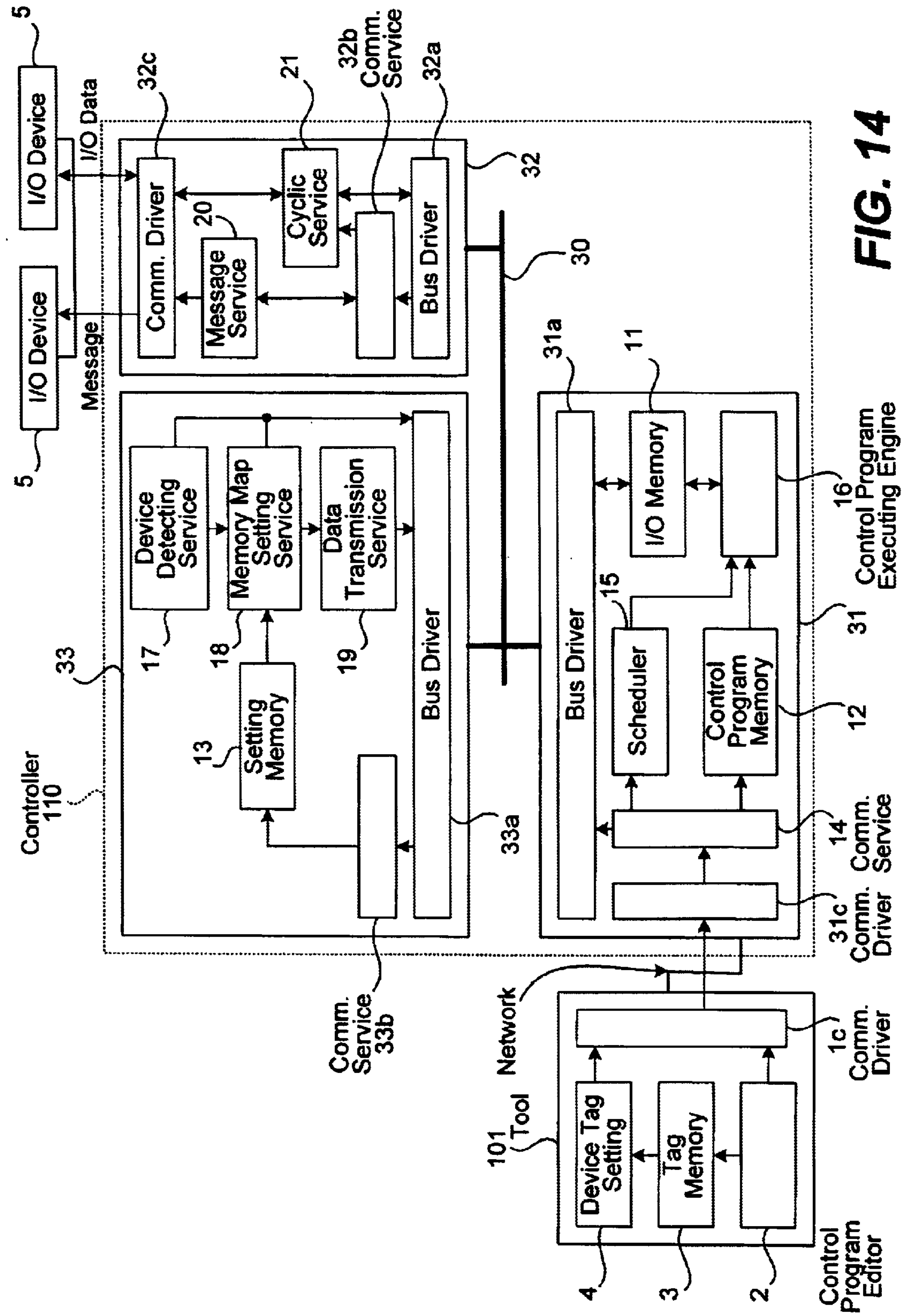
FIG. 14 is a block diagram of a communication unit according to a second embodiment of the invention.

FIG. 14 shows a second embodiment of the invention. This is basically the same as the embodiment described above but shows how to change a prior art controller not adapted for the plug-and-play format into a controller according to this invention.

For this purpose, it is to be noted that the controller 10 shown in FIG. 10 is different from a prior art controller in that there are the setting memory 13, the device detecting service 17 and the memory map setting service 18 additionally provided, the rest being substantially the same. The added function block is merely to be added to the conventional data linking and control program formats, and there is no need to modify the algorithms for the conventional data linking and control program formats. The second embodiment of the invention is therefore characterized in that the added function block is physically prepared in the form of an extension board separate from a conventional main body portion.

Explained more in detail with reference to FIG. 14, a bus 30 is provided inside the controller 110 for transmitting I/O data and message data therethrough and a CPU unit 31, a communication unit 32 and a plug-and-play unit 33 are connected to this bus 30. Each of these units is physically formed as a detachable board (or an extension board). Each function block shown above with reference to the first embodiment of the invention is appropriately disposed above each unit. Each unit (31, 32 or 33) can transmit and receive data (such as aforementioned I/O data and message data) through a bus driver 31*a*, 32*a* or 33*a* to or from the communication service 14, 32*b* or 33*b* of a specified unit. The communication services 14, 32*b* and 33*b* are adapted to transmit messages to the function block specified in the message.

Data are transmitted in blocks as the data transmission service 19 of the plug-and-play unit 33 and the cyclic service 21 of the communication unit 32 write on the I/O memory 11 in the CPU 31 through the bus drivers 31*a* and 32*a*. Exclusive control is carried out by the bus drivers 31*a*–33*a*. The bus drivers 31*a*–33*a* can request an interrupt of any of the units 31, 32 and 33 through the bus 30.

The tool 1 can transmit messages to the communication service 14 of the CPU unit 31 from the communication driver 1*c* within itself through the communication driver 31*c* of the CPU 31 unit. Network addresses which are independent on the network are assigned to the units 31–33. The communication service 14 of the CPU unit 31 transmits messages to the communication unit 32 and the communication services 32*b* and 33*b* according to the addresses on the messages transmitted from the tool 1. Thus, the tool 1 is capable of sending messages to the CPU unit 31, the communication unit 32 and the plug-and-play unit 33. In summary, the functions explained with reference to the first embodiment of the invention can be achieved also by the second embodiment of the invention.

Since the controller 110 includes three units which are separately mounted and are each assigned an independent network address, and since each unit is physically detachable, the controller 110 can be made into a controller of a conventional type by removing therefrom the plug-and-play unit 33. Thus, the user may remove the plug-and-play unit 33 when the plug-and-play function is not required and attaching it when the function is required. In this manner, the user can adapt to either situation by using most constituent parts in common.

It is common for a PLC to have an extensible bus system. If a plug-and-play unit 33 is structured to conform with such a bus system, a conventional PLC can be easily transformed into another with a plug-and-play function. In other words, PLCs from a presently operating production line can be extended.

Figure 15:
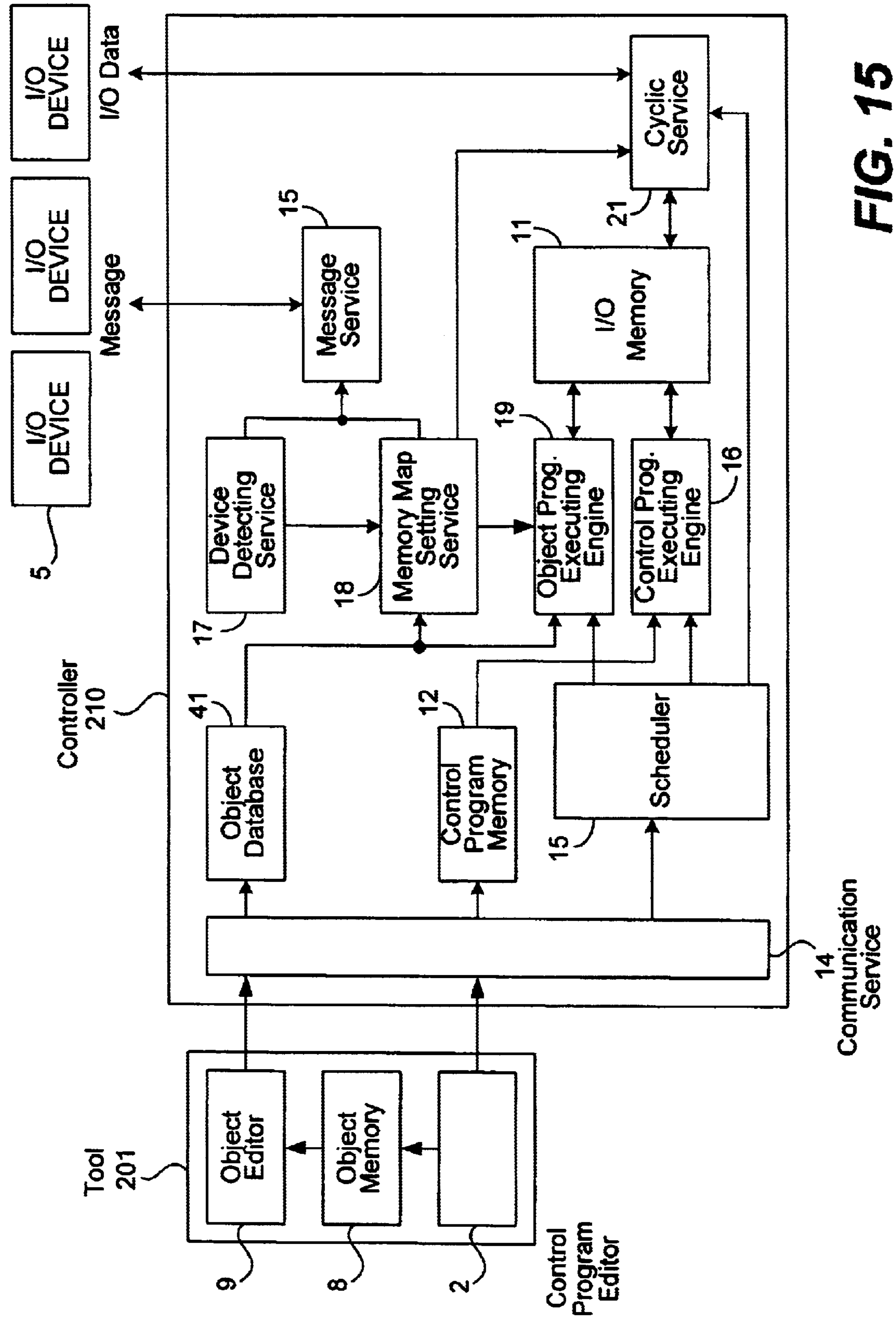
FIG. 15 is a block diagram of a communication unit according to a third embodiment of the invention.

FIG. 15 shows a third embodiment of the invention, characterized in that I/O devices 5 and a control program (driver) adapted to manage these devices 5 are correlated and integrated and can be handled as a single unit referred to as a control object. Data necessary for handling them in this form are stored in an object database 41 in the controller 210.

Thus, when an I/O device 5 is specified, its object name (device name) is used to distinguish it. In other words, when a device is to be read out in the control program, the prior art method has been to input its address directly but the device name is used for its definition according to this embodiment. Data on where the device specified by its device name is actually being connected are separately prepared and separately managed. As a result, when the control program and the device are connected to another controller (for reuse), only the relationship between device names and addresses is required to be modified even if there are changes in the addresses (such as memory address and communication address). The contents of the control program do not have to be modified in such a situation.

For the purpose of carrying out such processes, an object database 41 stores therein "control object name" and "device data comprising control objects" for recording device data which comprise control objects and data for distinguishing the devices by their object names. In the above, device data include the addresses (hereinafter also referred to as communication addresses) of the devices on a bus or a network. If the device is of a kind capable of storing the internal condition of a PLC, etc., there may be included device names defined by the user for the PLC, etc. and address data showing which area of the device such as a PLC is storing such device names. In the case of a device such as a simple digital I/O not capable of holding the internal condition, not only the device names defined by the user but also the serial numbers of the devices defined by their makers, etc. are also stored. In addition, interface data on control objects defined by the user (hereinafter referred to as object interface data, including service names, information on data types necessary for the service, names of object attributes and data on their types) may be recorded. Thus, the object database 41 enables the user to ascertain what devices constitute each control object and to distinguish each device by a logical name referred to as the object name.

These data referenced above may be installed by first creating them by a tool 201 and then downloading what were created by the tool 201 to the controller 210. As these data are downloaded to the controller 210, some necessary data are modified.

The tool 201 according to this embodiment, like the tool 1 according to the first embodiment of the invention, is provided with a control program editor 2 but, unlike the tool 1 of FIG. 1, includes an object memory 8 and an object editor 9, instead of the tag memory 3 and the device tag setting means 4 shown in FIG. 1.

In this example, each object is structured with a device included in the object and an interface definition of the object (property and method). The object editor 9 serves as a user interface for specifying devices and editing the interface definition.

FIG. 16 shows an example of such a user interface. "Object list" on the left-hand side is where defined object names are displayed. The objects can be newly created or deleted by the user. If the user selects one of the displayed objects, it becomes possible to edit the selected object. FIG. 16 shows that an object referred to as "Assembly object" has been selected. Data which have been set for the selected object are displayed on the upper right-hand side. The display is similarly structured as that by the device tag setting according to the first embodiment of the invention. The list of displayed variables, however, is limited to those of the object selected from the object list. Variables in the objects are all registered on this screen by using an input device of the tool 201. In this manner, variables can be added to or deleted from a variable list on this user interface. "Input variable" and "Output variable" may also be set. They are I/O variables for accessing the object and may be used in the control program.

On the lower right-hand side is a display of a program correlated to an object selected from the object list. This display area allows the user to describe a program by using the variables in the variable list. Any language such as C and PASCAL may be used as the program language.

Empty places on the I/O memory assigned by the object editor 9 for the objects are appropriately assigned as the I/O memory addresses for the variables used in the program correlated to the object.

Other functions such as "Replace Node Number by Serial Number" are the same as explained above with reference to the first embodiment of the invention and will not be repetitiously explained.

Figure 17:
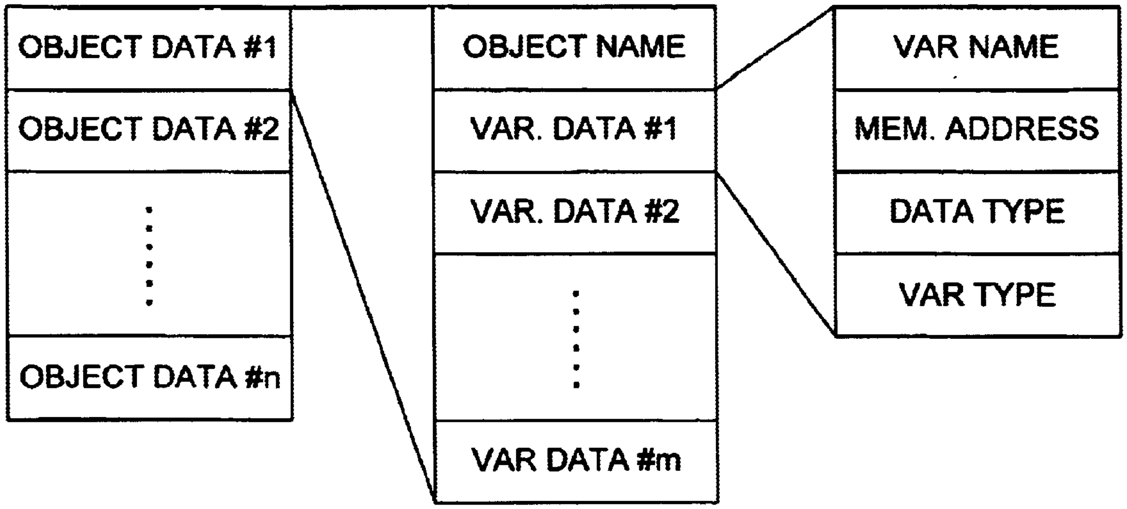
FIG. 17 shows an example of data structure of the object memory of FIG. 15.

Objects which have been created and edited by using such functions described above are stored in the object memory 8 and transmitted to the controller 210 through a communication service 14. The object memory 8 serves to record and keep data on only such variables specified as output and input variables of the object by the object editor 9. Its data structure is shown in FIG. 17, registration being made in object data units consisting of object name and variable data comprising the object with that object name. The object name is the name assigned to each of objects for distinguishing among them. "Carry in object", "Assembly object" and "Carry out object" shown in FIG. 16 are object names.

The number of variable data aligned is that defined in that object. All variables defined by the object editor 9 (such as all those variables displayed when "Assembly object" is selected as shown in FIG. 16) are extracted and sequentially stored. Each unit of variable data includes the variable name, memory address, data type and variable type. The variable type includes input variable and output variable. The other items are the same as explained above regarding the tag memory with reference to the first embodiment of the invention.

Although an example has been shown with objects containing only instances and not containing methods or classes, the latter may be included within the scope of this invention.

Figure 18:
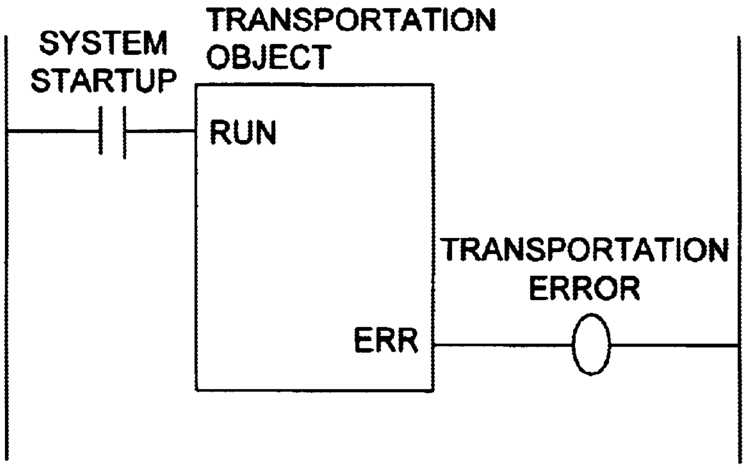
FIG. 18 shows an example of control program using objects.

FIG. 18 shows an example of control program using an object. In this example, an object named "Transportation object" is adapted to receive a value of an input variable (such as "System startup") from the control program, to carry out the program correlated to the object and to return its result (such as "Transportation error") through an output variable to the control program.

As shown in FIG. 15, the controller 210 according to the third embodiment, unlike to the controller 10 according to the first embodiment shown in FIG. 1, is provided not only with the object database 41 but also with an object program executing engine (or "data transmitting means") 43. Functionally, the object database 41 corresponds to the setting memory 13 and the object program executing engine 43 corresponds to the data transmission service 19. The object database 41 is for recording and holding all variable data (data on internal variables, input variables, output variables and I/O external variables) defined by the object editor 9 and transmitted from the tool 201 as well as programs correlated thereto.

Figure 19:
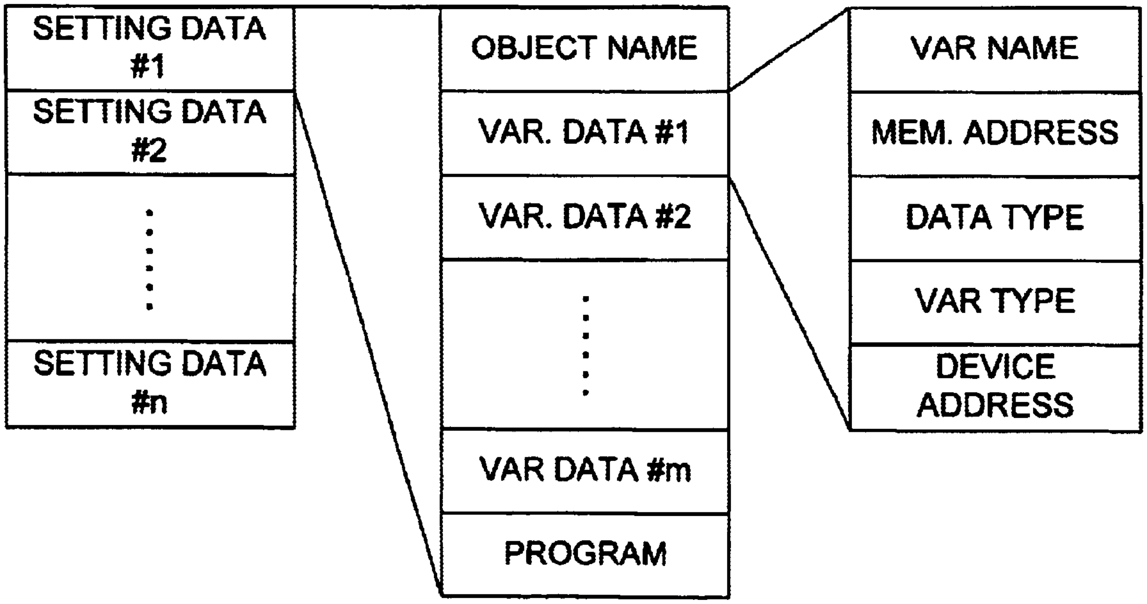
FIG. 19 shows an example of data structure in the object database of FIG. 15.

FIG. 19 shows an example of data structure in the object database 41. Units of setting data each including an object name, variable data and a program are sequentially recorded. Each unit of the variable data includes variable name, memory address, data type, variable type and device address. The variable type is a numerical value for distinguishing among "input variable", "output variable", "input external variable", "output external variable" and "internal variable". "Device address" contains a valid value only if the variable type is "input external variable" or "output external variable". The other data are the same as explained above with reference to the first embodiment. "Program" stores programs correlated, edited and coded by the object editor.

Mapping data on the I/O memory 11 related to the I/O external variables of the objects are created by the memory map setting service 18 and transmitted to the object program executing engine 43 and the cyclic service 21. As explained above with reference to the first embodiment of the invention with reference to FIG. 11, the mapping data function to keep unchanged the addresses on the I/O memory 11 referenced from the side of the control program and to correlate addresses that are referenced and the addresses assigned to the devices.

The object program executing engine 43 possesses both the functions of the data transmission service 19 of the first embodiment of the invention and the functions of executing programs correlated to objects. In other words, it has the function of carrying out data transmission on the I/O memory 11 on the basis of the correlation data between the addresses on the I/O memory 11 referenced from the side of the control program and the addresses on the I/O memory 11 assigned to the devices to be referenced by the control program originally. For executing programs, its functions include referencing values of input variables, output variables, input external variables, output external variables and internal variables and writing in values of output variables, output external variables and internal variables by executing and evaluating programs. In other words, objects as shown in FIG. 18 are executed, and the values of output variables obtained as a result of an execution are outputted to the control program and the values of output external variables are outputted through the data transmission service function and the cyclic service 21 to I/O devices 5.

Although an example has been described above wherein the function for executing the program correlated to an object is incorporated in the object program executing engine 43, it may be incorporated in the control program executing engine 16. Creation of a memory map when a new device has been detected by the device detection service 17 and processing of actual I/O variables by using the data linking format based on a created memory map are the same as explained above with reference to the first embodiment.

Figure 20:
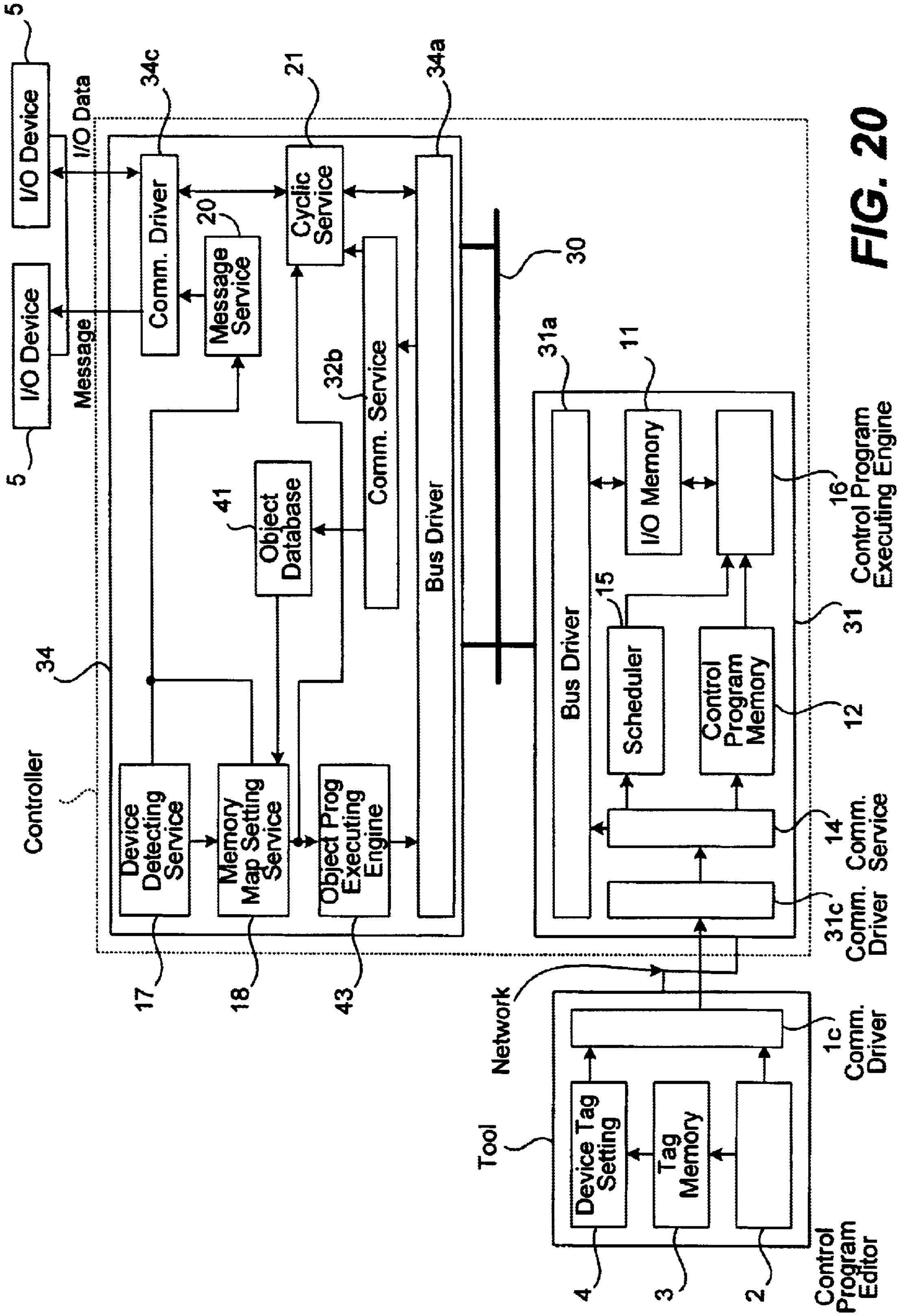
FIG. 20 is a block diagram of a communication unit according to a fourth embodiment of the invention.

FIG. 20 shows a fourth embodiment of this invention, characterized as being based on the third embodiment and similar to the second embodiment in that it is structured with a plurality of units detachably attached to a bus 30. The example shown in FIG. 20 has two boards with a CPU unit 31 and a communication unit 34, the latter having a plug-and-play function block incorporated.

The two units 31 and 34 can transmit and receive data to and from each other through bus drivers 31*a* and 34*a*. The communication unit 34 transmits and receive messages and I/O data to and from I/O devices 5 through a communication driver 34*c*. A comparison between FIGS. 15 and 20 will make it clear that these two embodiments are functionally the same except that the function of connecting through the bus 30 is added. In other words, the fourth embodiment has the same functional effects as the third embodiment.

Although the plug-and-play function was incorporated in the function block of the communication unit 34 in this example, it may be incorporated in the CPU. Alternatively, similar to the second embodiment, a separate unit may be provided for this function. Furthermore, the first embodiment may be modified to incorporate a plug-and-play function block in the communication unit as done in the fourth embodiment or in the CPU unit.

In summary, the data linking format is used according to this invention and since the variable data area and the device data area are assigned as different areas and data can be transmitted between them, I/O external variables can be inputted and outputted by setting such areas and without modifying the control program, or the plug-and-play format can be utilized. Moreover, extension boards and communication units can be used to convert a system not adapted for the plug-and-play format to an adapted system.

What is claimed is:

1. A controller for controlling devices that are connected thereto, said controller comprising:

memory means inside said controller for storing data;

device detecting means for detecting a device connected to said controller and obtaining device identifying data on the detected device;

memory map setting means for setting a device data area on said memory means, based on the obtained device identifying data, for transmitting and receiving data to and from said device and producing a memory map which correlates said device data area with a variable data area on said memory correlated to said device;

communicating means for periodically transmitting and receiving data to and from said device in a data linking format according to said memory map by using said device data area on said memory means; and data transmitting means for transmitting data according to said memory map between said variable data area on said memory means and said device data area.

2. The controller of claim 1 further comprising correlation data storing means for storing correlation data for correlating said control program and said device, said control program accessing said device by referencing said correlation data to thereby identify an access address.

3. An extension board to be connected to a controller controlling a device connected to said controller; said extension board comprising:

device detecting means for detecting a device connected to said controller and obtaining device identifying data on the detected device;

memory map setting means for setting a device data area on memory means inside said controller, based on the obtained device identifying data, for transmitting and receiving data to and from said device and producing a memory map which correlates said device data area with a variable data area on said memory correlated to said device; and data transmitting means for transmitting data according to said memory map between said variable data area on said memory means and said device data area.

4. A communication unit for communicating with a device connected to and controlled by a controller containing a memory means; said communication unit comprising:

device detecting means for detecting said device connected to said controller and obtaining device identifying data on the detected device;

memory map setting means for setting a device data area on said memory means, based on the obtained device identifying data, transmitting and receiving data to and from said device and producing a memory map which correlates said device data area with a variable data area on said memory correlated to said device;

communicating means for periodically transmitting and receiving data to and from said device in a data linking format according to said memory map by using said device data area on said memory means; and data transmitting means for transmitting data according to said memory map between said variable data area on said memory means and said device data area.

* * * * *